United States Patent [19]

Whiting et al.

[11] Patent Number: 4,869,011
[45] Date of Patent: Sep. 26, 1989

[54] FILLET KNIFE RETAINING FISHING ROD

[76] Inventors: Lowell A. Whiting; Arleta M. Whiting, both of P.O. Box 9336, Chico, Calif. 95927

[21] Appl. No.: 348,198
[22] Filed: May 5, 1989
[51] Int. Cl.$^4$ ............................................. A01K 87/00
[52] U.S. Cl. ........................................................ 43/23
[58] Field of Search ............................. 43/18.1, 23, 25

[56] References Cited

U.S. PATENT DOCUMENTS

| | | | |
|---|---|---|---|
| 2,003,893 | 6/1935 | La Pan | 43/23 |
| 2,678,817 | 5/1954 | Mitton | 43/23 |
| 3,521,393 | 7/1970 | Gordon | 43/25 |
| 3,875,600 | 4/1975 | Reveaux | 43/23 |
| 4,048,743 | 9/1977 | Lapinski | 43/23 |

Primary Examiner—M. Jordan

[57] ABSTRACT

The invention provides a stainless steel fillet knife and a sharpening rod encased removable in the handle of a fishing rod similar to a typical rod and reel fishing rod. The middle section or reel seat of the handle is hollow forming a chamber which encases the blade of a fillet knife. The butt grip of the rod is the handle of the fillet knife and attaches removable to the reel seat by external threads in a neck fitting internal threads in a captive attachment ring. An O-ring between the two sections water seals the knife compartment. The interior of the butt grip is also hollow and a silicon padded chamber houses a diamond steel sharpening rod. The sharpening rod has a plug-like handle arranged inserted removable through an aperture into the butt end of the butt grip. The sharpening rod can be withdrawn for use by pulling the handle which is accessible on the back surface of the butt cap. The sharpening rod handle is structured of luminescent material and glows in the dark. Coverings on the rod handle make the fishing rod buoyant. A tubular accessory sheath is provided for the knife which allows the knife to be carried attached to the user when the fishing rod is not required.

9 Claims, 3 Drawing Sheets

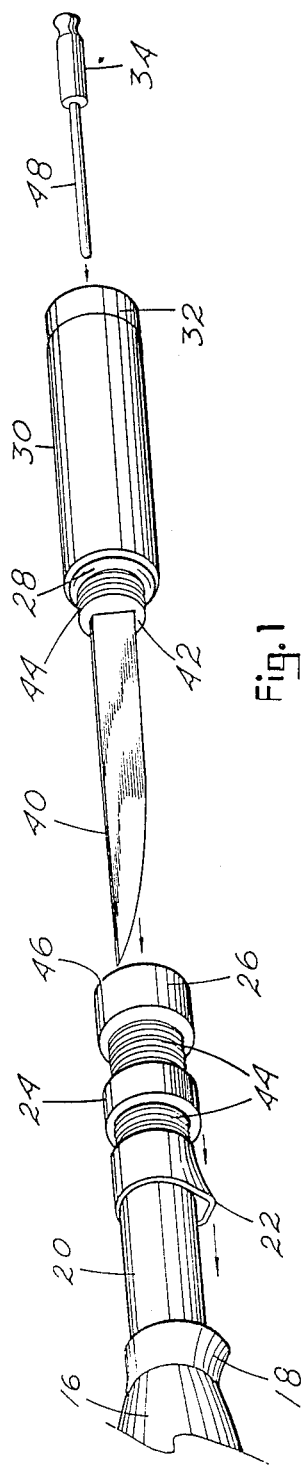
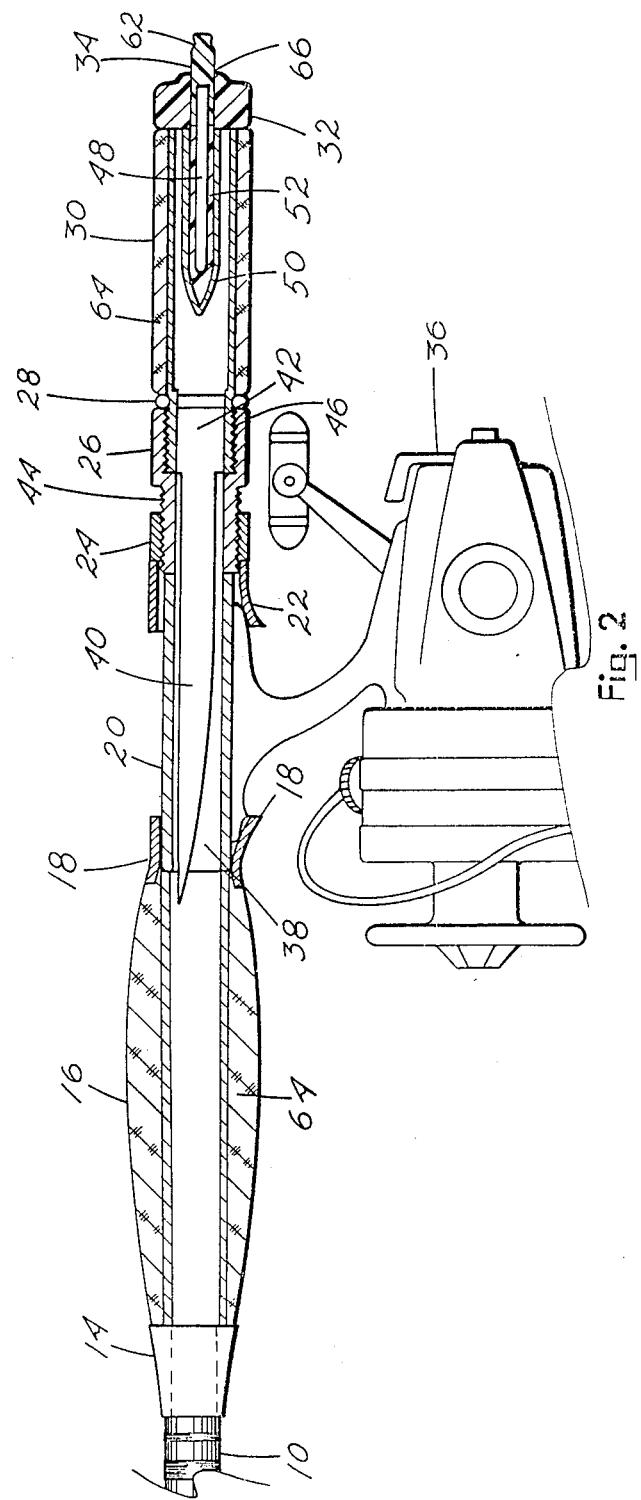

FILLET KNIFE RETAINING FISHING ROD

BACKGROUND OF THE INVENTION

1. Field of the Invention

This invention relates to fishing equipment in general and more precisely to a fishing rod handle designed to retain a fillet knife and a diamond steel sharpening rod.

2. Description of the Prior Art

The sport of fishing has been practiced for thousands of years and remains a popular past time in this country. Among the myriad of accessory equipment used by fishermen is the common fillet knife and a knife sharpener. A Fisherman must generally pack and transport these items in an already crowded tackle box, a fishing bag, or he carry them on his person. There is always the possibility of misplacing or forgetting accessory equipment and attempts have been made to consolidate these devices to provide convenience and reduce bulk. Most efforts were directed towards compact survival knives in special cases. As our device is directed towards sheathing a useful knife in the handle of a fishing pole, to the best of our knowledge, nothing similar is available in the market place at the present time. To examine patented devices, a search was conducted in the classes and subclasses including 43/4, 23, 25, 25.2, 18.1, 6, 54.1, 7/106, 167, and 158. The search was directed towards producing past art patents incorporating knives and knife sharpeners as part of conventional rod and reel style fishing poles. Of the patents examined, the following appear most pertinent to our invention:

1. U.S. Pat. No. 2,003,893, dated June 4, 1935, was issued to L. K. La Pan for a fishing rod with modified hand grip. The hand grip contains a measuring tape and weighing scale.

2. The Mitton device, issued on May 13, 1954, U.S. Pat. No. 2,678,817, shows a combination fishing pole handle and weighing scale.

3. On Apr. 8, 1975, Reveaux was granted U.S. Pat. No. 3,875,600, for a survival kit which combines a pivotal knife, retractable wire saw, and a wind-up fishing line within a small hand-sized housing. Although a small pivotal knife is shown, the handle is not designed for use with a fishing pole.

4. A patent for a hand caster was issued to Lapinski on Sept. 20, 1977, U.S. Pat. No. 4,048,743, which shows a handle with enclosed light and knife with a reel affixed endwardly. No pole is provided.

Although the Lapinski and Reveaux patents show hand held fishing devices with enclosed knifes, neither are of a similar nature to the present invention. Lapinski shows a small knife with no handle probably useful only for cutting a fish line. The Reveaux device is simply a survival kit not meant for use with a pole. The Lapinski and Reveaux devices are representative of past art handles encasing knives and having some usefulness for fishing. Provisions for retaining a sharpening device within the handles is not shown. If either of these devices were modified for use with a pole, both require custom made reels and the wide variety of standard commercially available reels cannot be used. This also limits the versatility of the device.

The La Pan and Mitton devices represent more conventional style fishing poles with handles modified with a compartment. A useful knife is not provided in either device. Instead, the handle compartments are used to retain weighing scales or tape measurers. There are no means provided for retaining knives or sharpening stones and none has been anticipated in the specification or illustrated in the drawings.

Our device is designed to simulate conventional fishing poles in both function and appearance. Not only can efficient casting of the line be accomplished with the fishing hole, the reels can also be exchanged. The added advantage of an intrinsic fillet knife and a knife sharpener provides additional convenience for the fisherman.

SUMMARY OF THE INVENTION

In the sport of fishing, conventional styles fishing rods seem to be most readily accepted. Therefore, we have designed our device similar in appearance and function to standard rod and reel fishing poles and we have provided a fillet knife and sharpening rod hidden inside the handle. Our fishing pole comprises a standard fishing rod with affixed eyelets for fishing line guides and means for removably attaching a reel. The middle section or reel seat of the handle is hollow and contains exterior threads retaining a captive attachment ring. The attachment ring is internally threaded and arranged for removable attachment of the butt grip to the reel seat of the fishing pole. The butt grip is endwardly affixed with external threads and is the handle for a stainless steel fillet knife sized to fit inside the interior of the reel seat and foregrip of the handle. A rubber O-ring adjacent the butt grip knife end over the external threads provides water proof sealing when the butt grip is screwed down tightly to the reel seat. The interior of the butt grip is also hollow and houses an elongated sharpening rod. The sharpening rod is comprised of diamond steel and is sometimes referred to as the sharpening steel. The sharpening rod has a plug-like cylindrical handle and is arranged removable inserted into the butt end of the butt grip with the end of the plug-like handle accessible.

An accessory case or sheath is provided for the knife which allows the knife to be carried on the user when the fishing pole is not required. The case is tubular in structure and has a closed bottom end and an opened top end which contains internal threads. The external threads of the detached fillet knife correlate with the internal threads of the case. A rubber O-ring which compresses between the knife handle end and the case top forms a watertight connection when the knife hand is screwed down into the case. The case has an exterior clip or a loop for attachment to the belt or pocket of the person carrying the knife.

The foregrip and butt grip of the handle have an exterior layer of buoyant material which allows the fishing pole and knife to float. This provides for easy retrieval of the items should they fall into the water. The handle end of the sharpening rod is manufactured of luminescent material which glows in the dark, making locating a lost fishing rod easier.

Therefore it is a primary object of our invention to provide a fishing pole which is conventional in appearance and function and contains a hidden fillet knife and sharpening rod.

Another object of our invention to provide a fishing pole and fillet knife with sharpening rod which is buoyant in water.

A further object of our invention is to provide a fishing pole with hidden fillet knife and sharpening rod which has an luminescent feature making the device easier to located in the dark.

A still further object of our invention is to provide a portable carrying case for the detachable fillet knife and sharpening rod.

Other objects and advantages of our invention will prove apparent by reading the following specification while concurrently reviewing the accompanying numbered drawings.

BRIEF DESCRIPTION OF THE DRAWINGS

FIG. 1 is an exploded perspective view of the reel seat and butt grip of the handle of the fishing pole, showing the fillet knife with a sealer O-ring on the butt grip threads and sharpening rod on the right.

FIG. 2 is a cross-sectional side view of the entire handle of the fishing pole. A reel is shown affixed to the bottom of the reel seat and the O-ring is illustrated sealing the butt grip to the end of the reel seat.

DESCRIPTION OF THE PREFERRED EMBODIMENT

Figure 3:
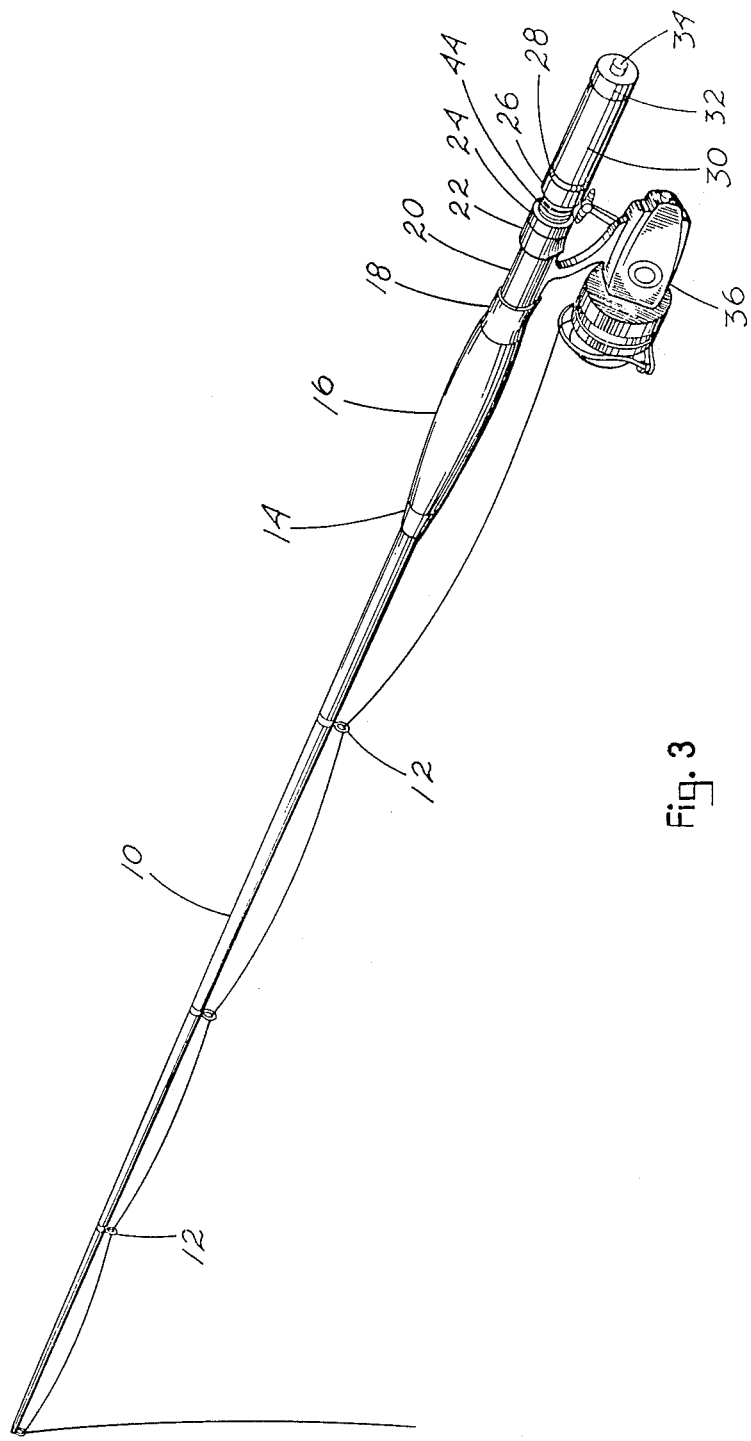
FIG. 3 is a perspective assembled view of the invention.
Figure 4:
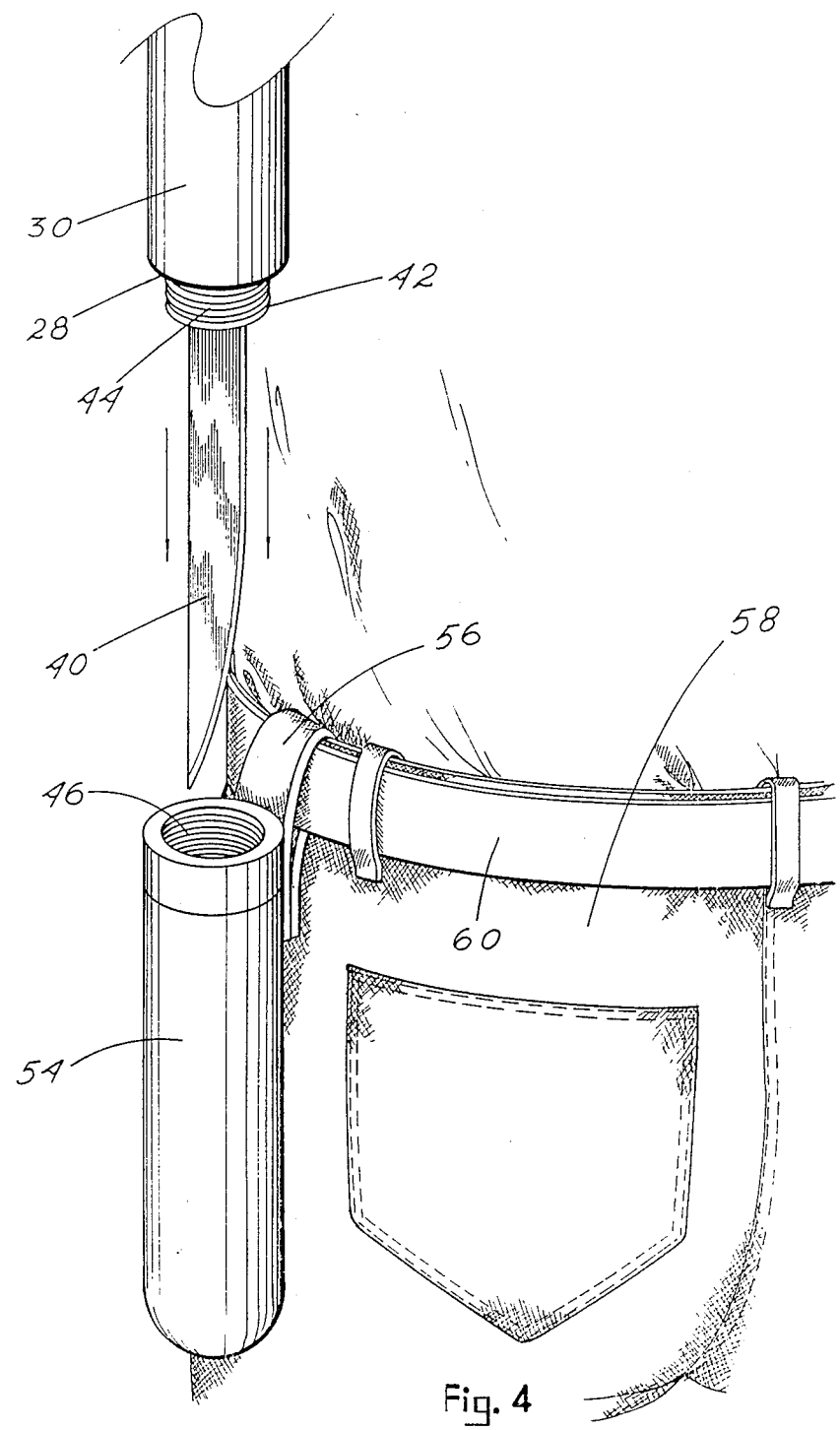
FIG. 4 is a perspective view of the accessory case attached to a user's belt.

Referring now to the drawings where the immediate invention, as illustrated, comprises a fishing rod 10 with an elongated pole having eyelets, fishing line guides 12, spaced therealong. The support end of fishing rod 10 is attached to foregrip 16 at chuck 14. Foregrip 16 is a hollow tubular handle covered with a convexly formed corklike material, buoyant material 64, which is comfortable to hold and helps keep the pole afloat if dropped into the water. Attached as a continuation of foregrip 16 is a short hollow tubular middle section, reel seat 20, arranged with fittings, hood 18, rear hood 22, and rear hood lock ring 24, used to attach removable spinning reel 36 to reel seat 20. External threads 44 provide coursing for a rear hood lock ring 24 to lock rear hood 22 against the foot of spinning reel 36. Attached adjacent rear hood lock ring 24 at the terminal end of reel seat 20, is a fixed ring, butt grip attachment ring 26. Butt grip attachment ring 26 is stationary and has internal threads 46 inside which fit and retain external threads 44 on butt grip neck 42 which is the manner in which butt grip 30 attaches removable to reel seat 20 to complete full assemblage of the device. Butt grip 30 is affixed with a stainless steel fillet knife 40 and is the handle for fillet knife 40. Fillet knife 40 protrudes from butt grip neck 42 and when butt grip 30 is removed from reel seat 20, a useful handled fillet knife 40 is available immediately. The hollow tube area of reel seat 20 is knife chamber 38 and the blade of fillet knife 40 is protectively retained in knife chamber 38 when butt grip 30 is reattached to reel seat 20. For water proof sealing, a rubberized O-ring 28 on butt grip neck 42 is compressed between the end walls of butt grip 30 and fixed butt grip attachment ring 26 where the two sections meet. The covering of butt grip 30 is buoyant material 64 which along with the buoyant material 64 of foregrip 16 will cause the handle assemblage of the immediate invention to float and make recovery of the fishing rod easy should it be accidentally dropped into the water.

Illustrated in the drawings and unique to the immediate invention is an encased sharpening rod 48 protectively retained in sharpening rod chamber 50 inside of butt grip 30. Sharpening rod 48 is structured of diamond steel and is affixed at one end with a plug-like cylindrical handle, sharpening rod handle 34. Sharpening rod handle 34 is retained removable in aperture 66 through the end surface of butt cap 32. For further protection, water proofing, and maintenance of sharpening rod 48, sharpening rod chamber 50 is filled with a soft rubberized silicon material, silicon 52. During manufacturing, the encasement material, silicon 52, is poured hot into sharpening rod chamber 50 and sharpening rod 48 is inserted into the still warm material. As the material cools, sharpening rod 48 is withdrawn leaving a tight fitting soft surfaced passageway for protective encasement of sharpening rod 48 in silicon 52 inside of sharpening rod chamber 50. Sharpening rod chamber 50 is inside of butt grip 30 towards the butt cap 32 end. Sharpening rod 48 can be withdrawn from butt grip 30 by pulling on sharpening rod handle 34 and the handled sharpening rod 48 is immediately ready for use. After use, sharpening rod 48 is reinserted into sharpening rod chamber 50 being retained there by silicon 52 and the pressure of aperture 66 against sharpening rod handle 34. Sharpening rod handle 34 is manufactured of luminescent material 62 which charges in sunlight and glows to make the fishing rod assemblage easy to find if it falls in the water or is looked for at night.

An accessory tubular knife sheath 54 is provided for fillet knife 40 which allows fillet knife 40 to be carried by illustrative user 58 when the fishing pole is not required. Accessory tubular knife sheath 54 is a hollow tubular structure with a closed bottom end and an opened top end. Inside, the opened top end has internal threads 46 which match external threads 44 on butt grip neck 42. fillet knife 40 is retained in accessory tubular knife sheath 54 similarly to the fishing rod attachment described. O-ring 28, on butt grip neck 42 effectively water seals the ends of accessory tubular knife sheath 54 and butt grip 30 where the two surfaces connect when butt grip neck 42 is screwed down into accessory tubular knife sheath 54. Illustrative user 58 can attach accessory tubular knife sheath 54 to illustrative user's belt 60 by belt attachment fitting 56 which can be a clip, a single belt loop, or a fastenable strap.

It is to be understood that descriptions in the foregoing specifications although using words common to the nomenclature of a spinning rod along with other part descriptions referenced to the drawings is primarily for illustrative purposes and is not meant to limit the invention to a particular form and we will consider modifications of the invention to be our invention when the modified invention falls within the intended scope of the appended claims.

What we claim is:
1. A fishing rod with a fillet knife in a handle end of said rod, comprising:
   an elongated fishing pole affixed with spaced looped fish line guides;
   said elongated fishing pole attached to a hollow tubular first handle;
   said first handle including a chuck, a foregrip, and a reel seat, there being means affixed to said reel seat for removably attaching a fishing reel and means for removably attaching a second handle;
   said second handle being a butt grip having means at one end for said attaching, said attachment end of said butt grip having a fillet knife blade extended therefrom with said butt grip being a handle completing a useful fillet knife;
   a sharpening rod is affixed to said second handle;

said fillet knife blade encased in said tubular first handle when said second handle, said butt grip, is attached thereto.

2. The fishing rod of claim 1 wherein said means affixed to said reel seat for removably attaching a fishing reel includes front and rear reel foot attachment hoods with said rear hood adjustable for reel foot sizes and lockable on said reel foot by a thread positioning rear hood lock ring.

3. The fishing rod of claim 1 wherein said means for removably attaching a second handle includes an attachment ring affixed at a terminal end of said first handle with said attachment ring internally threaded compatibly with an externally threaded neck at said attachment end of said butt grip, said butt grip being said second handle.

4. A fishing rod with a fillet knife and a knife sharpener accessibly compartmented in a handle end, comprising:
   an elongated fishing pole affixed with spaced looped fish line guides;
   said elongated fishing pole attached to a hollow tubular first handle;
   said first handle including a chuck, a foregrip, and a reel seat, there being means affixed to said reel seat for removably attaching a fishing reel and means for removably attaching a second handle;
   said second handle being a butt grip having means at one end for said attaching, said attachment end of said butt grip having a fillet knife blade extended therefrom with said butt grip being a handle completing a useful fillet knife;
   said fillet knife blade encased in said tubular first handle when said second handle, said butt grip, is attached thereto;
   means for water proof sealing said first handle and said second handle at said attachment;
   a sharpening rod affixed to a cylindrical handle;
   said sharpening rod removably encased in a silicon lined compartment inside said butt grip with said cylindrical handle accessibly protruding through an aperture in a butt cap covering a terminal end of said butt grip;
   means providing buoyancy for said fishing rod;
   illuminant means in said cylindrical handle of said sharpening rod.

5. The fishing rod of claim 4 wherein said means affixed to said reel seat for removably attaching a fishing reel includes front and rear reel foot attachment hoods with said rear hood adjustable for reel foot sizes and lockable on said reel foot by a thread positioning rear hood lock ring.

6. The fishing rod of claim 4 wherein said means for removably attaching a second handle includes an attachment ring affixed at a terminal end of said first handle with said attachment ring internally threaded compatibly with an externally threaded neck at said attachment end of said butt grip, said butt grip being said, second handle.

7. The fishing rod of claim 4 wherein said means for water proof sealing said first handle and said second handle at said attachment includes a rubberized O-ring.

8. The fishing rod of claim 4 wherein said means providing buoyancy for said fishing rod includes a buoyant material covering said foregrip of said first handle and a buoyant material covering said butt grip of said second handle.

9. The fishing rod of claim 4 wherein said illuminant means in said cylindrical handle of said sharpening rod includes said cylindrical handle being fabricated with luminescent material included. attached thereto.

* * * * *